Patented Jan. 11, 1949

2,458,512

UNITED STATES PATENT OFFICE 2,458,512

ACYLATION OF THIOPHENE

Howard D. Hartough, Pitman, N. J., and Alvin I. Kosak, Columbus, Ohio, assignors to Socony-Vacuum Oil Company, Incorporated, a corporation of New York No Drawing. Application December 21, 1945, Serial No. 636,512

15 Claims. (Cl. 260—329)

This invention relates to a process for the acylation of thiophenes and, more particularly, is directed to a method for acylating thiophene and its derivatives in the presence of certain porous, absorptive silica-metallic oxide catalysts hereinafter described.

Acylation reactions are well known in the art and connote the union between acyl radicals and molecules of organic compounds under conditions of temperature, pressure, and time ordinarily referred to in the art as acylating conditions. The compounds thus produced represent, structurally, the substitution of the original acyl radical on the organic compound molecule with the elimination of a hydrogen atom.

As a general rule, the temperature, pressure and time of reaction employed in acylation operations depend upon whether the acylation is effected in the absence or presence of acylation catalysts. The two methods are generally referred to as thermal and catalytic acylation, respectively. The majority of acylation processes fall under the latter category and it is a catalytic acylation process with which the present invention is concerned.

The acyl radicals may be furnished in acylation reactions by various materials commonly referred to as acylating agents. Thus, organic acid anhydrides, acyl halides and acyl nitriles have served as sources of the acyl radical. In particular, acetic anhydride and acetyl chloride have found wide application in acylation operations.

The acylation of thiophene and thiophene derivatives has previously been carried out employing one of the above-mentioned acylating agents in the presence of various catalysts including aluminum chloride, stannic chloride, titanium tetrachloride, phosphorus pentoxide and 2-chloromercurithiophene. Other methods of making acylated thiophene include the dry distillation of calcium salts of thiophene carboxylic acids and the action of nitriles on thienyl-magnesium iodide.

Of these processes, the catalytic methods employing Friedel-Crafts type catalyst, such as aluminum chloride, stannic chloride, titanium tetrachloride, and the like, have been used most extensively. These catalysts, although applicable with considerable success in the acylation of aromatic hydrocarbons, are only moderately successful where thiophene is involved. This appears to be due to the relative instability of the thiophene ring; the Friedel-Crafts catalyst, for example, aluminum chloride, attacking the sulfur and causing many undesirable secondary reactions with concomitantly low yields of acyl thiophenes. Furthermore, compounds such as aluminum chloride form addition complexes with the carbonyl group of the resulting ketone substantially decreasing the yield of desired product and requiring a considerable excess of aluminum chloride over the theoretical amount required for the acylation process. Thus, when aluminum chloride is used as the condensing agent, the mole ratio of catalyst to acyl chloride or acyl nitrile is, at least, one and, in the case of acid anhydrides, at least two. Likewise, other Friedel-Crafts catalysts, such as stannic chloride, must be used in molecular quantities with respect to the acyl halide being employed in the acylation of thiophene. This is probably due to the fact that acyl halides form comparatively stable molecular complexes with aluminum chloride and stannic chloride, thereby diminishing their catalytic effect.

Moreover, the usual acylation catalysts often cause excessive resinification of the thiophene reactant. The resinification usually occurs before acylation can be effected and if the expected reaction product is formed, it is generally only in relatively small amounts.

It has now been discovered that acylated thiophenes may be obtained in an efficient manner by reacting thiophene or thiophene derivatives with an acylating agent in the presence of a porous, absorptive catalyst comprising silica and an oxide of a metal selected from group IV, sub-group A, and the iron sub-group of group VIII, of the Mendeléeff periodic table. Thus, the present invention contemplates a process for acylating thiophenes in the presence of a catalyst comprising silica and at least one oxide of the following metals: titanium, zirconium, hafnium, thorium, iron, nickel and cobalt. It has been found that by using such a catalyst, the above-mentioned difficulties encountered in the acylation of thiophene have largely been overcome. Thus, by employing a silica-metallic oxide catalyst of one or more of the above metals, the undue resinification and formation of addition complexes formerly encountered in the catalytic acylation of thiophene have been substantially eliminated, the products resulting being almost entirely acyl thiophenes having one or more side chains corresponding to that of the acylating agent. It has been found, in accordance with this invention, that the described porous silica-metallic oxide composites effect the acylation of thiophene smoothly and specifically in contrast to the more conventional catalysts employed heretofore, giving a substantial yield of desired ketone without accompanying formation of complex addition products and resinification.

It is, accordingly, an object of the present invention to provide an efficient process for synthesizing acylated thiophenes. Another object is to provide a process for catalytically acylating thiophene and its derivatives. A still further object is to afford a process for catalytically acylating thiophene in a relatively simple and direct manner which can be easily carried out using an inexpensive, easily obtainable catalyst. A very important object is to provide a process capable of reacting thiophene or its derivatives with an acylating agent in the presence of an efficient catalyst without undue formation of addition complexes between the catalyst and thiophene or between the catalyst and acylating agent.

These and other objects which will be recognized by those skilled in the art are attained in accordance with the present invention, wherein thiophene or its derivatives are acylated by reaction with organic carboxylic acid anhydrides or acyl halides in the presence of a porous absorptive catalyst comprising silica and an oxide of a metal selected from group IV, sub-group A, and the iron sub-group of group VIII, of the Mendeléeff periodic table.

Particularly effective in promoting the acylation of thiophenes are the synthetic gel composites of silica and one of the above-named metallic oxides. These materials are well known in the art and include the silica-zirconia gels, silica-thoria gels, etc., which may be formed in various ways as, for example, depositing the desired metallic oxide on silica, or by combining a silica gel and one or more of the above metallic oxide gels, or by preparing a silica-metallic oxide gel. The described porous, absorptive silica-metallic oxide catalysts are employed in the process of this invention usually in a finely divided form and in amounts between about 2% and about 25%, based on the weight of the reactants.

The acylating agents to be used herein may be an acyl halide or an organic carboxylic acid anhydride. Included in the latter category are those compounds having the basic structure.

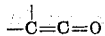

which, upon addition of water, yield organic carboxylic acids. These acylating agents may be derived by methods well known to the art from mono or dibasic organic acids which may be either unsaturated or saturated. Thus, representative acylating agents to be used in this invention include the anhydrides of saturated fatty acids, such as acetic anhydride, propionic anhydride, ketene, etc.; the acyl halides of saturated fatty acids, such as acetyl chloride, stearyl chloride, etc.; the acyl halides of dibasic acids, such as phthalyl chloride; the anhydrides of unsaturated acids, such as crotonic anhydride; and the acyl halides of unsaturated acids, such as crotonyl chloride. These acylating agents are given merely by way of examples and are not to be construed as limiting, since other acyl halides or anhydrides of carboxylic acids which will readily suggest themselves to those skilled in the art may likewise be used.

Thiophene or derivatives of thiophene having one or more substituent groups, such as halogen, alkyl, aryl, or alkoxy groups attached to the thiophene ring, may be acylated in accordance with this invention. The 2- and 5- positions in the thiophene ring, being adjacent to the sulfur atom, are generally much more reactive than the 3- and 4-positions and, in acylating thiophene, the entering acyl group will preferably attach itself to the carbon atom adjacent to the sulfur. When the 2-position of the thiophene ring is already occupied by a substituent group or atom, the entering acyl group will preferably attach itself to the 5-position. When the 3-position is occupied, the acyl substituent will enter for the most part at the 2-position. However, in some instances a small portion of the 3,5-product may be obtained. Thiophene derivatives having substituents of a highly negative character, such as carbonyl, ester, nitro and cyano groups, and no activating substituent, such as a hydroxy or alkoxy group, do not acylate readily. These groups, commonly referred to as meta-directing, possess a highly electronegative character which tends to inhibit the acylation reaction.

The acylation of thiophene or its derivatives may be carried out employing equimolar quantities of thiophene and acylating agent. However, in general, the presence of an excess of one of the reactants has been found to give an increased yield of the desired product.

The reaction rate is largely a function of the temperature, increasing with increasing temperatures, the upper limit of temperature being dependent on the boiling point of the reactant at the specific pressure of the reaction. In general, temperatures of between about 80° C. and about 150° C. and pressures of between atmospheric and about six atmospheres have been found satisfactory for effecting the acylation reaction. The effect of increased pressure, theoretically, is toward increased reaction, but from a practical standpoint, this is not a very great effect with reactions such as those involved herein, which go readily at normal pressures. The temperature to be employed will depend on the time of reaction and the nature of the acylating agent used. Ordinarily, a pressure sufficient to maintain the reactants in the liquid phase is employed and this is more or less dependent upon the particular temperature involved. As a general rule, the higher the temperature, the higher the pressure and the lower the reaction time that may be used. It is, of course, to be understood that these reaction variables are more or less interdependent.

Under the conditions encountered in the process of this invention, however, the reaction period will generally vary from about 1 to 10 hours. Considerably shortened reaction times are to be avoided, since it has been found that under the conditions set forth, periods substantially less than one hour are insufficient for completion of the reaction.

The silica-metallic oxide catalyst used herein may be employed in amounts as little as 2 per cent by weight of the reactants. The catalyst, as indicated, will consist predominately of silica. One or more of the above-mentioned metallic oxides will be present in the catalyst, generally in an amount less than about 40 per cent and preferably between about 5 and about 25 per cent by weight of the catalyst employed. The weight ratio of silica to the metallic oxide used will, in general, accordingly be not less than three to one and preferably between about four to one and about twenty to one.

The oxides of metals present in group IV, sub-group A, and the iron sub-group of group VIII, of the Mendeléeff periodic table, in combination with silica in the proportions above-indicated, have the property of promoting the acylation of thiophene in accordance with the present invention. This property appears to be confined, with the exception of the silica-alumina catalysts disclosed in co-pending application, Serial No. 619,251, filed September 28, 1945, to the metallic oxides indicated. Thus, it has been found that beryllia-silica gels and boria-alumina gels, which in some respects are similar to the catalysts of the present invention, do not promote the acylation of thiophene. Neither a gel consisting solely of silica nor a gel consisting solely of one of the metallic oxides used herein, such as zirconia, has any catalytic effect in promoting the acylation process of thiophene. It is, accordingly, apparent that the catalyst used in the present invention should essentially comprise silica and at least one of the metallic oxides: titania, zirconia, thoria, hafnia, hematite, oxide of cobalt, and oxide of nickel. The components of the catalyst should suitably be intimately combined in a porous, absorptive composite, such as a gel.

The catalyst when used should preferably have a fairly small particle size. After continued use in the acylation process, the silica-metallic oxide catalyst becomes spent due to the deposition of impurities on its surface, and may be reactivated by heating at an elevated temperature sufficient to burn off the impurities and hence restore the catalyst to its original activity. The original catalyst may, accordingly, be reused a considerable number of times before it degenerates completely and must be discarded.

Acylated thiophenes produced in accordance with this invention are useful as solvents, dye intermediates, addition agents for petroleum fractions, plasticizers, odorants, perfume diluents, resin intermediates and intermediates for chemical synthesis. Long chain alkyl thienyl ketones may also find uses as synthetic lubricants, waxes, extreme pressure additives for mineral oils and anti-foaming agents.

The following detailed examples are for the purpose of illustrating modes of effecting the acylation of thiophene in accordance with the process of this invention. It is to be clearly understood that the invention is not to be considered as limited to the specific acylating agents disclosed hereinafter or to the manipulations and conditions set forth in the examples.

*Example 1*

To a mixture of 84 grams (1 mole) of thiophene and 110 grams (1 mole) of 95% acetic anhydride were added 10 grams of a synthetic gel composite containing 10% zirconia and 90% silica previously ground to pass through a 60-mesh screen. The reactants were heated with stirring at a reflux temperature increasing from 106° C. to 114° C. over a period of 4 hours. The resulting reaction mixture was then cooled and the catalyst removed by filtration. The filtrate was distilled and 44 grams (35% conversion) of 2-acetylthiophene were obtained.

*Example 2*

To a mixture of 168 grams (2 moles) of thiophene and 148 grams (1 mole) of benzoyl chloride were added 20 grams of the synthetic zirconia-silica gel composite described in Example 1. The particle size of the catalyst used was about 4-6 mesh. Hydrogen chloride was evolved at room temperature and the evolution became more vigorous as the temperature was slowly raised to reflux over a period of 2 hours. The reaction mixture was then refluxed for 4 hours at a temperature rising from 95 to 100° C. The resulting reaction mixture was cooled and decanted from the catalyst into a solution of sodium hydroxide and water-washed until neutral. 50 grams of additional thiophene were added to facilitate washing and to reduce mechanical losses. After water-washing free of caustic, the material was transferred to a still and 160 grams of thiophene were recovered. 105 grams of 2-benzoylthiophene were obtained upon further distillation under reduced pressure. The yield of product obtained, based on the thiophene used, was 87.5% of theory.

*Example 3*

To a mixture of 84 grams (1 mole) of thiophene and 110 grams (1 mole) of 95% acetic anhydride were added 10 grams of a synthetic gel composite containing 23% thoria and 77% silica previously ground to pass through a 60-mesh screen. The reactants were refluxed at temperatures progressively rising from 100 to 105° C. over a period of 4 hours. The resulting reaction mixture was then cooled and the catalyst removed by filtration. The filtrate was distilled under reduced pressure, yielding 28 grams of 2-acetylthiophene, which represented 22% of theory.

*Example 4*

To a mixture of 84 grams (1 mole) of thiophene and 110 grams (1 mole) of 95% acetic anhydride were added 10 grams of a synthetic gel composite containing 6% hematite and 94% silica previously ground to pass through a 60-mesh screen. The materials were refluxed at temperatures progressively rising from 99° to 105° C. over a period of 10 hours. Upon removal of the catalyst and distillation, 20 grams (16% of theory) of 2-acetylthiophene were obtained.

From the above examples, it will be apparent to those skilled in the art that relatively small amounts of silica-zirconia, silica-hematite and silica-thoria gels are effective catalysts in promoting the acylation of thiophene. Likewise, the present invention contemplates the use, in combination with silica, of the oxides of the remaining metals in sub-group A, of group IV, of the periodic table, namely, hafnium and titanium, and the other metals of the iron sub-group in group VIII, of the periodic table, namely, cobalt and nickel.

The above invention is to be given a broad interpretation in the light of the prior art and is not to be unduly limited, except as hereinafter defined by the appended claims.

We claim:

1. A process for nuclear acylation of a thiophene, comprising reacting the same with an acylating agent selected from the group consisting of acyl halides and anhydrides of carboxylic acids in the presence of a porous, absorptive catalyst, comprising silica and at least one oxide of a metal selected from the group consisting of those in group IV, sub-group A, and those in the iron sub-group, of group VIII, of the Mendeléeff periodic table.

2. A process for nuclear acylation of a thiophene, comprising reacting the same with an acylating agent selected from the group consisting of acyl halides and anhydrides of carboxylic acids in the presence of a porous, absorptive silica-thoria composite.

3. A process for nuclear acylation of a thiophene, comprising reacting the same with an acylating agent selected from the group consisting of acyl halides and anhydrides of carboxylic acids in the presence of a porous, absorptive silica-hematite composite.

4. A process for nuclear acylation of a thiophene, comprising reacting the same with an acylating agent selected from the group consisting of acyl halides and anhydrides of carboxylic acids in the presence of a porous, absorptive silica-zirconia composite.

5. A process for nuclear acylation of a thiophene, comprising reacting the same with an acylating agent selected from the groups consisting of acyl halides and anhydrides of carboxylic acids in the presence of a porous, absorptive catalyst, comprising silica and at least one oxide of a metal selected from the group consisting of those in group IV, sub-group A, and those in the iron sub-group, of group VIII, of the Mendeléeff periodic table, the silica-metallic oxide ratio of said catalyst being between about 4:1 and about 20:1.

6. A process for nuclear acylation of a thiophene, comprising reacting the same with an acylating agent selected from the group consisting of acyl halides and anhydrides of carboxylic acids in the presence of a porous, absorptive silica-thoria composite, the silica-thoria ratio of which is between about 4:1 and about 20:1.

7. A process for nuclear acylation of a thiophene, comprising reacting the same with an acylating agent selected from the group consisting of acyl halides and anhydrides of silica-hematite composite, the silica-hematite ratio of which is between about 4:1 and about 20:1.

8. A process for nuclear acylation of a thiophene, comprising reacting the same with an acylating agent selected from the group consisting of acyl halides and anhydrides of carboxylic acids in the presence of a porous, absorptive silica-zirconia composite, the silica-zirconia ratio of which is between about 4:1 and about 20:1.

9. A process for nuclear acylation of a thiophene, comprising reacting the same with an acylating agent selected from the group consisting of acyl halides and anhydrides of carboxylic acids in the presence of a porous, absorptive catalyst, comprising silica and at least one oxide of metal selected from the group consisting of those in group IV, sub-group A, and those in the iron sub-group, of group VIII, of the Mendeléeff periodic table, at a temperature of between about 80° C. and about 150° C. for a period of from about 1 to 10 hours.

10. A process for nuclear acylation of a thiophene, comprising reacting the same with an acylating agent selected from the group consisting of acyl halides and anhydrides of carboxylic acids in the presence of a porous, absorptive silica-thoria gel at a temperature of between about 80° C. and about 150° C. for a period of from 1 to about 10 hours.

11. A process for nuclear acylation of a thiophene, comprising reacting the same with an acylating agent selected from the group consisting of acyl halides and anhydrides of carboxylic acids in the presence of a porous, absorptive silica-hematite gel at a temperature of between about 80° C. and about 150° C. for a period of from about 1 to about 10 hours.

12. A process for nuclear acylation of a thiophene, comprising reacting the same with an acylating agent selected from the group consisting of acyl halides and anhydrides of carboxylic acids in the presence of a porous, absorptive silica-zirconia gel at a temperature of between about 80° C. and about 150° C. for a period of from about 1 to about 10 hours.

13. A process for nuclear acylation of thiophene, comprising reacting the same with an acylating agent selected from the group consisting of acyl halides and anhydrides of carboxylic acids in the presence of between about 2 and about 25 per cent by weight of a porous, absorptive catalyst comprising silica and at least one oxide of a metal selected from the group consisting of those in group IV, sub-group A, and those in the iron sub-group of group VIII, of the Mendeléeff periodic table.

14. A process for making acetylthiophene, comprising reacting thiophene with acetic anhydride in the presence of a porous, absorptive catalyst comprising silica and at least one oxide of a metal selected from the group consisting of those in group IV, sub-group A, and those in the iron sub-group of group VIII, of the Mendeléeff periodic table.

15. A process for making benzoylthiophene, comprising reacting thiophene with benzoyl chloride in the presence of a porous, absorptive catalyst comprising silica and at least one oxide of a metal selected from the group consisting of those in group IV, sub-group A, and those in the iron sub-group of group VIII, of the Mendeléeff periodic table.

HOWARD D. HARTOUGH.
ALVIN I. KOSAK.

REFERENCES CITED

The following references are of record in the file of this patent:

UNITED STATES PATENTS

| Number | Name | Date |
|---|---|---|
| 2,295,977 | Thomas | Sept. 15, 1942 |

OTHER REFERENCES

Calloway, Chem. Rev. 17, 376-7 (1935).